UNITED STATES PATENT OFFICE.

HERMANN ENDEMANN, OF BROOKLYN, NEW YORK.

GLYCEROL ETHER OF AROMATIC COMPOUNDS.

SPECIFICATION forming part of Letters Patent No. 599,123, dated February 15, 1898.

Application filed April 11, 1896. Serial No. 587,212. (No specimens.)

*To all whom it may concern:*

Be it known that I, HERMANN ENDEMANN, a citizen of the United States of America, and a resident of Brooklyn, in the county of Kings and State of New York, have invented certain new and useful Improvements in Medicinal Compounds, of which the following is a specification.

It has long been known that many phenol-like medicinal substances may be caused to lose their irritant action by converting the same with acids into esters, and that the substances thus produced have the property of decomposing in the body, thereby liberating the medicinal substance and allowing it thus to act within the body in the free state. The mixed ethers obtained by the combination of these substances with alcohol radicals—as ethyl, methyl, &c.—have shown too much stability, perhaps due to their great insolubility in water. I have discovered that these substances may be converted into glycerin ethers which possess properties which make them desirable compounds for medical use. They do not possess this high degree of insolubility and are much easier to decompose than the other ethers mentioned, and as products of decomposition there are obtained in the body the free medicinal body and glycerin, which latter substance is a food pure and simple. Thus I obtain the action of the medicinal body free from any other.

I have converted the following phenol-like substances into their corresponding glycerin ethers: betanaphthol, alphanaphthol, resorcin, thymol, guaiacol, eugenol, carvacrol, and the ethyl and glyceryl salicylic-acid esters.

Some oxy derivatives owe their therapeutical action to the fact that in the body they are decomposed, yielding a phenol-like body. Such bodies are the naphthoxacetic acids. They cannot be converted into ethers. Hence I produce their esters.

For the production of glycerin ethers from substances such as those above mentioned I combine the phenol-like substance with sodium hydrate and cause the same to act upon monochlorhydrin in molecular proportions and at an elevated temperature, generally between 140° and 150° centigrade. In the case of substances which contain two hydroxyl groups, like resorcin, I cause two molecules of sodium hydrate to act upon one molecule of the phenol-like substance and two molecules of monochlorhydrin, or in place of the latter one molecule of dichlorhydrin. The glycerin ethers thus obtained may be separated from the other products of the reaction by means of ether. Where the reagents or products are sufficiently non-volatile at high temperatures, it is possible to carry out the reaction in open vessels. In other cases it is better to operate in closed vessels. The reaction is more uniform in the presence of a diluent, such as glycerin. We may use, therefore, crude monochlorhydrin.

For the production of guaiacol ether of glycerin I use one hundred and twenty-four parts of guaiacol, forty parts of caustic soda, and one hundred and eleven parts of monochlorhydrin, to which is added sufficient glycerin to form a mass thin enough to be stirred. This mixture is then heated while being stirred to from 140° to 150° centigrade for several hours, until the alkaline reaction has vanished. The mass is then diluted with water. The glycerin ether is for the most part left undissolved. The portion dissolved in the water solution may be extracted from the latter by ether.

The reaction in the case of guaiacol is as follows:

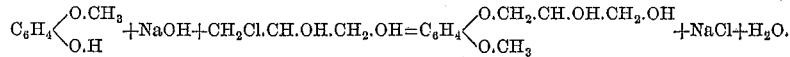

With betanaphthol the reaction proceeds according to the following formula:

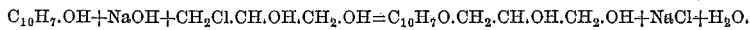

I have also discovered that the esters of salicylic acid, as oil of wintergreen, may be converted into glycerin ethers. When the salicylic glycerin ester is used, the reaction proceeds according to the following formula:

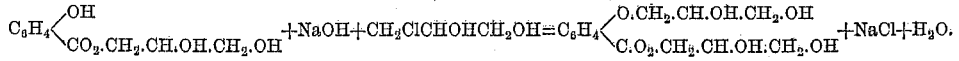

In order to produce the glycerin esters of the phenoxacetic acids, I allow the sodium salt of the phenoxacetic acid to act upon chlorhydrin at 140° to 150° centigrade for several hours or until the reaction is finished.

In the case of beta-naphthox acetic acid the reaction is carried out according to the following scheme:

$$C_{10}H_7.O.CH_2.CO_2.Na + CH_2Cl.CH.OH.CH_2.OH = C_{10}H_7O.CH_2.CO_2.CH_2.CH.OH.CH_2.OH + NaCl.$$

The three last reactions described may be carried out in open vessels, while the first reaction described is best carried out in a closed vessel.

The physical properties of the substances obtained differ according to the nature of the substances taken for their preparation. So, for instance, in the case of the monoglycerin ethers of the naphthols the melting-points are found to be considerably lower than the melting-points of the respective naphthols. On the other hand, in the case of the monoglycerin ethers of guaiacol or carvacrol the melting-points of the ethers are found to be higher than the melting-points of the corresponding original substances. The glyceryl-glyceryl salicylate is an oily liquid, but not so viscous as the glyceryl salicylate from which it is obtained. It has as yet not been obtained in the solid form. All these bodies have a decided bitter taste, combined with a flavor denoting their origin. While, therefore, the physical properties of these bodies differ, the chemical properties are alike in so far as under proper treatment for decomposition of ethers—as, for instance, heating with water slightly acidified with sulfuric acids they yield glycerin and a phenol-like body differing according to the nature of the substance used in their preparation. These bodies are soluble in alcohol, ether, glycerin, and animal and vegetable oils, and generally more soluble in water than the phenol-like body from which they are derived. As remedial agents they are employed in quantities dependent on the quantity of the active body from which they are derived. Guaiacol may be given in doses ranging from 0.1 gram to one gram. Since the molecular weight of guaiacol is one hundred and twenty-four and the molecular weight of the glycerin ether is one hundred and ninety-eight, the dose of the ether would range from 0.16 gram to 1.6 gram.

The antiseptic and antifebric actions of these ethers and esters if employed in doses proportionate to their strength practically are the same as the actions of the pure body from which they are derived, with the difference, however, that the irritating effect is mitigated or entirely removed.

What I claim as new is—

1. As new products, the glycerin ethers of aromatic substances containing oxygen in the form of hydroxyl, such as guaiacol, having the following characteristic properties, to wit—a bitter taste, solubility in alcohol and ether, and slight solubility in water, and which, when heated with dilute acids, split and liberate a corresponding phenol-like substance and glycerin, said products being composed according to the following general formula—

$$\underset{\underset{OH}{|}\phantom{xx}\underset{OH}{|}}{CH_2 - CH - CH_2O - R.}$$

2. As new products, the glycerin ethers of the esters of aromatic oxy acids, such as oil of wintergreen, having the following characteristic properties, to wit—a bitter taste, solubility in alcohol and ether, and slight solubility in water, and which, when heated with dilute acids, split and liberate a corresponding phenol carbonic acid and glycerin; said products being composed according to the following general formula—

$$\underset{\underset{OH}{|}\phantom{xx}\underset{OH}{|}}{CH_2 - CH - CH_2O - R;}$$

where R is the radical of an ester of an aromatic oxy acid.

In testimony that I claim the foregoing as my invention I have signed my name, in presence of two witnesses, this 9th day of April, 1896.

H. ENDEMANN.

Witnesses:
   A. FABER DU FAUR, Jr.,
   EUGENIE A. PERSIDES.